March 24, 1931.  E. B. SCOTT ET AL  1,798,038
APPARATUS FOR SLICING MEAT AND THE LIKE
Filed March 29, 1928  4 Sheets-Sheet 1
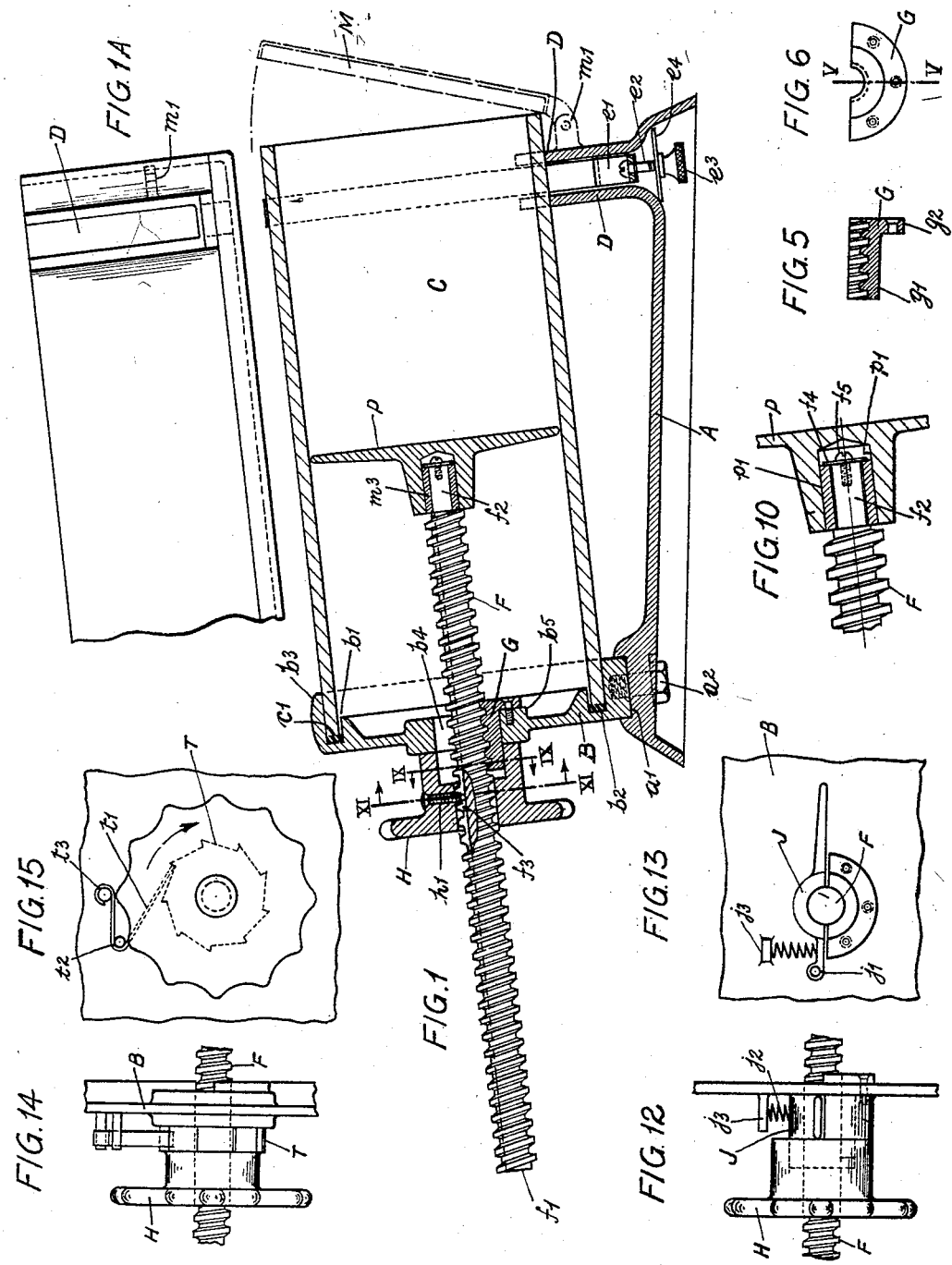

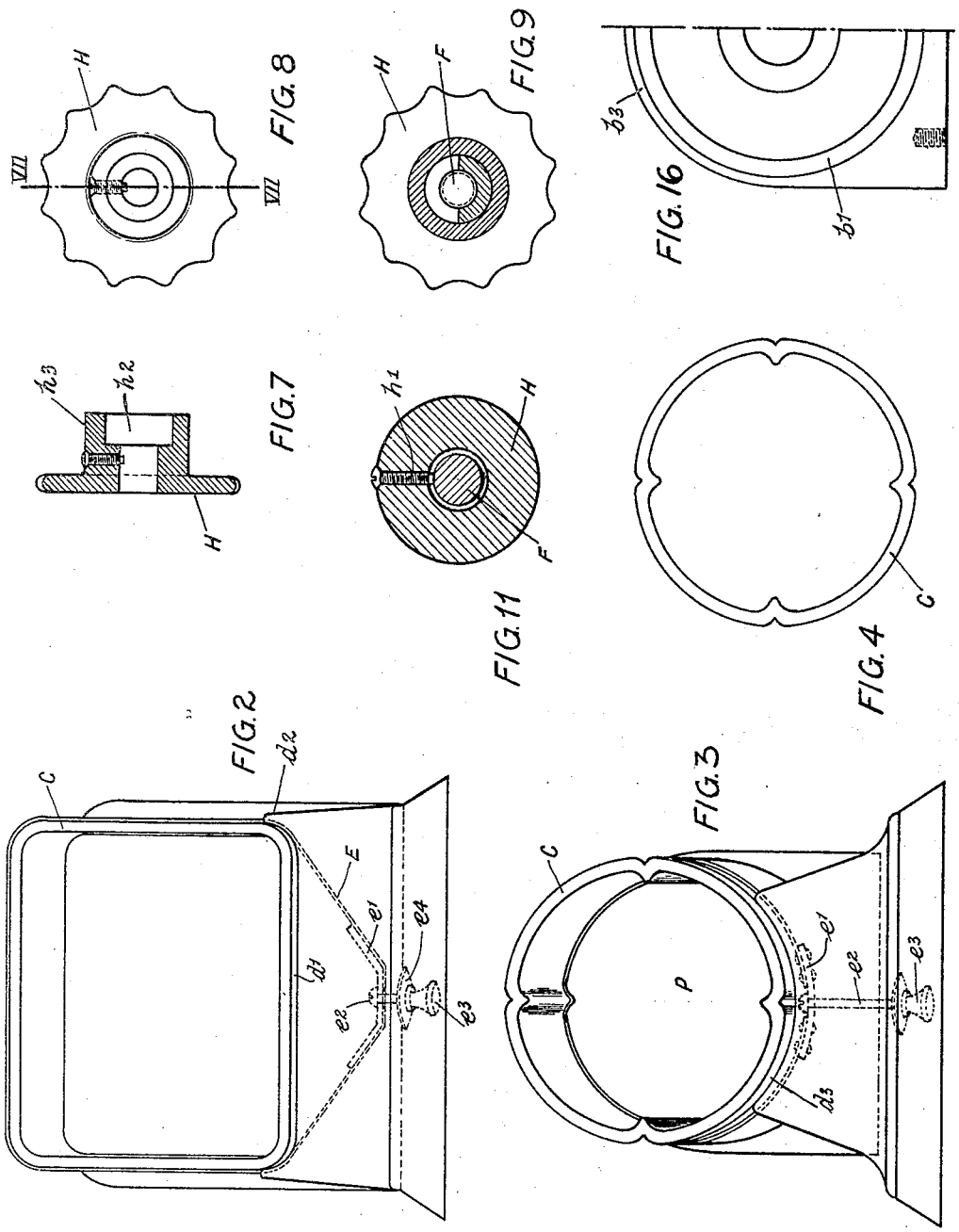

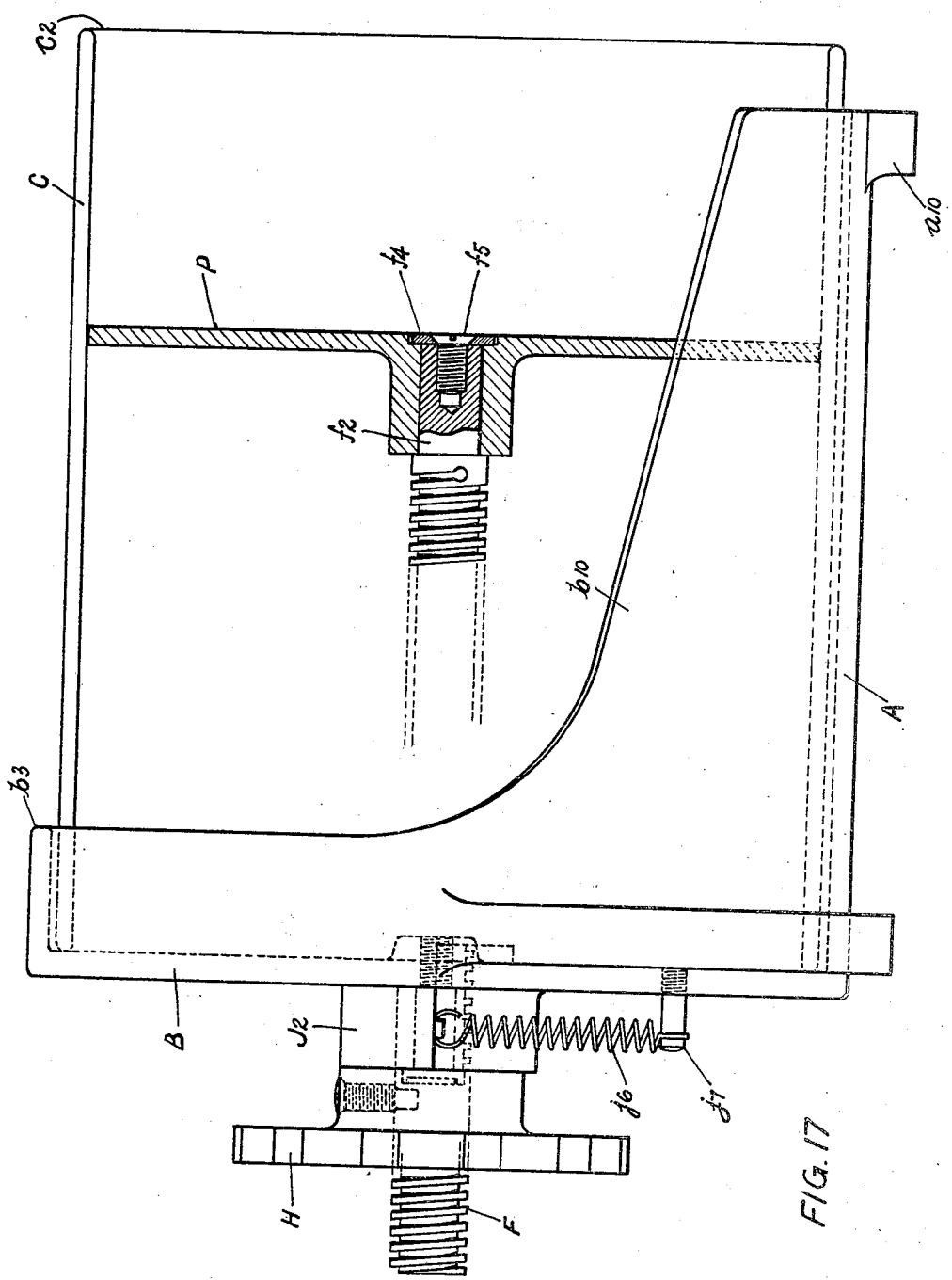

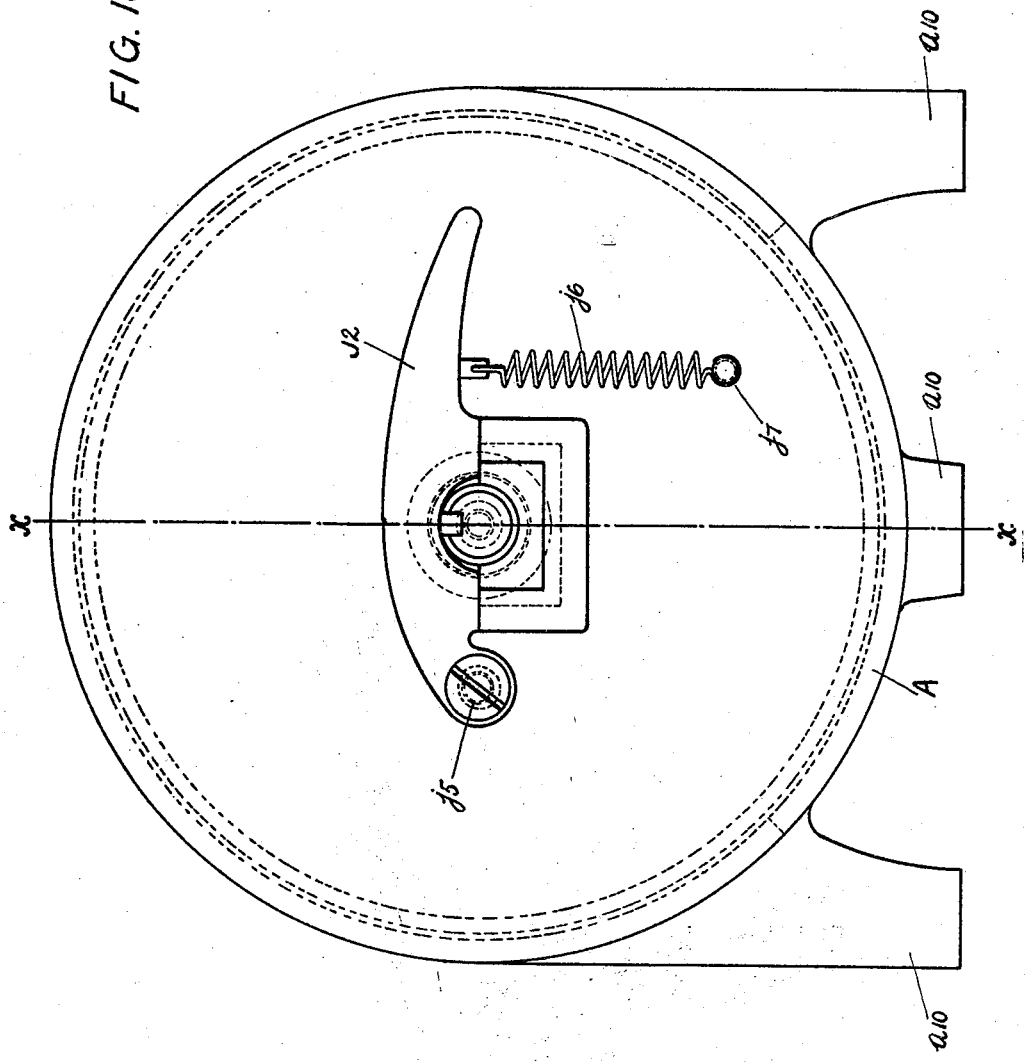

Patented Mar. 24, 1931

1,798,038

UNITED STATES PATENT OFFICE

ERNEST BASELEY SCOTT, OF RHYL, NORTH WALES, AND JOHN HENRY DAVIES, OF LONDON, ENGLAND; ALFRED LEWIS JONES EXECUTOR OF SAID ERNEST BASELEY SCOTT, DECEASED

APPARATUS FOR SLICING MEAT AND THE LIKE

Application filed March 29, 1928, Serial No. 265,707, and in Great Britain March 31, 1927.

This invention relates to apparatus for slicing meat, particularly for slicing pressed meats such as beef, tongue and the like, preserved in air-tight cans or glass receptacles, of that type comprising a container adapted to take a rectangular tapered slab of pressed beef, or a cylindrical slab of tongue, the said slab being fed forward towards the open end of the container, the edges of which open end are adapted to guide the knife edge, in the act of slicing, so that the cutting edge moves in a plane at right angles to the direction of the feed, which may be adjusted to give the desired thickness of slice.

According to the invention the container or casing through which the slab of meat is fed is made of glass or other transparent material, connected at its rear end to a back plate so as to be held in alignment with the feed device carried thereby, and so supported at the front end which forms the guide surface for the slicing knife as to be adapted to resist the pressure of the slicing cut. The back plate may be integral with, but is usually secured to the base plate, and the front of the container is preferably supported on a cradle-like upward extension from the front of the base, and it is preferably secured in position by a metal band encircling the front end, the ends of the band being connected to a bridge piece which is drawn taut by a clamping stud.

In the preferred form the feed screw is pivotally connected to a piston or pressure plate which engages the rear of the slab of meat to be sliced, and the feed is given by rotating the screw in a fixed screw-threaded part carried by the back plate; preferably the said part is a half nut so arranged that when it is desired to give a quick motion to the feed screw in either direction it may be moved transversely clear of the nut and slid as required. The hand wheel by which the feed screw is rotated is preferably feathered on the screw so that it can be slid along the screw, and be maintained adjacent to the back plate and over the base during operation. The feed-screw may be retained in position in engagement with the half nut by a spring-operated presser piece, or the hand wheel may be so arranged that when it is in position adjacent to the back plate it engages with the back plate and holds the feed-screw concentrically in position in the half nut.

Where the slab of meat to be sliced is of circular cross-section, the container may be provided with one or more internal longitudinal ribs which engage the meat and prevents its rotation in the casing in the act of slicing.

The construction of the several parts is such that the hand wheel may be disconnected from the feed-screw, and the feed-screw and piston be disconnected from the apparatus, by a simple sliding movement; and the connection between the container and the base and back plate of the apparatus is such that by releasing a clamping stud, the container may be freed from the rest of the apparatus.

The invention also includes improvements in details of construction as hereinafter described and claimed.

The invention is illustrated, by way of example, in the accompanying drawings, in which:—

Fig. 1 is an elevation in conventional medial section, and may be regarded as an elevation of an apparatus provided with a container of circular cross-section or of rectangular cross-section.

Fig. 1A is a fragmentary plan.

Fig. 2 being an end view showing a container of rectangular cross-section.

Fig. 3 an end view of a container for meat of circular cross-section.

Fig. 4 is an end view of the cylindrical container alone.

Figs. 5 and 6 are detail views of the half nut, Fig. 5 being in section on the line V, V of Fig. 6.

Figs. 7 to 9 are views of the hand wheel, Fig. 7 being an end elevation in section on the line VII, VII of Fig. 8, Fig. 8 a face view, and Fig. 9 a view in section on the line IX, IX of Fig. 1.

Fig. 10 is a fragmentary view to an enlarged scale of the housing of the end of the feed-screw in the piston.

Fig. 11 is a section, to an enlarged scale, on the line XI, XI of Fig. 1.

Figs. 12 to 15 are detail views of modifications; Fig. 12 being a fragmentary side elevation, Fig. 13 an end elevation, Fig. 14 a fragmentary side elevation and Fig. 15 an end elevation.

Fig. 16 is a half face view of a back plate suitable for a cylindrical container.

Figs. 17 and 18 illustrate a modification; Fig. 17 being a side elevation, and Fig. 18 an end elevation viewed from the rear.

Referring first to the modification illustrated in Figs. 1 to 11, and Fig. 16:—

A is the base plate, B a back plate secured thereto, the base of the back plate fitting a facing $a1$ on the base A, to which the back plate is secured by bolts $a2$ inserted from the underside of the base plate. C is the container which is preferably of glass or other transparent material, which does not oxidize, and therefore has no injurious action on the meat, and being transparent displays the meat on the counter in such manner that an intending customer may be assured of the cleanliness of the arrangement.

The container is preferably open at both ends, and the rear face $c1$ fits in a recess $b1$ formed in the back plate, the rear edge of the container abutting against a rubber or the like elastic pad $b2$, the flange $b3$ of the back plate extending round the container. The container may be of square (as shown at C′, Fig. 2), rectangular, or circular cross-section, the groove $b1$, pad $b2$ and flange $b3$ being modified accordingly.

Fig. 1 is an elevation corresponding with the end view Fig. 2 which shows the rectangular container, and may also, with slight modification, serve as an elevation of the arrangement illustrated in Fig. 3 in which the container is circular.

The front of the container rests on a cradle-like seating D which may be bolted to, or, as shown in the drawings, be made integral with, the base plate A. The cradle is made hollow, having front and rear walls and an open top, the configuration of the top being arranged to suit either the rectangular container as in Fig. 2, in which case the bearing portions $d1$ is flat with upturned round edges $d2$; or the said bearing part may be of circular configuration as shown at $d3$, Fig. 3, to take the round surface of a cylindrical container.

The container is pressed axially home so as to make a firm joint with the pad $b2$, and to be located in proper relationship to the back plate B, and it is then clamped in this position and on to its cradle D, by any suitable means; such means preferably comprise a thin steel band E, the opposite ends of which are united to a bridge piece $e1$, the ends of the band and bridge piece being located in the hollow interior of the cradle D. The bridge piece is fitted with a clamping bolt $e2$ and nut $e3$, the latter bearing against a fixed washer $e4$, the arrangement being such (see Figs. 1, 2 and 3) that when the nut $e3$ is screwed up the bridge piece $e1$ is drawn down, the tension applied to the band E clamping it against axial or transverse movement.

As stated, when the container is of circular cross-section it may be provided with one or more internal longitudinal ribs $c2$ which engage the meat and prevent its rotation in the casing in the act of slicing.

Within the container is located a piston P connected to a feed-screw F, the feed-screw passing through a fixed screw-threaded part or nut centrally located in the back plate B. The fixed screw-threaded part may be a complete nut, and the end $f1$ of the feed-screw may have keyed to it a suitable hand-wheel, the end $f2$ of the screw being fixed to, or being rotatably mounted in the piston P so as to be incapable of axial movement relatively thereto.

With a complete nut it is necessary, in order to remove the piston back to the position shown in Fig. 1, after a slab of meat has been completely sliced, to produce this return movement by the comparatively long operation of rotating the screw in the nut, a similar movement being necessary should it be required to remove the piston for cleaning. We prefer, therefore, to fit a half-nut G, and to make the bore $b4$ in the back-plate and the fit of the piston P in the container such that the feed-screw can be displaced laterally so as to be disengaged from the threads of the nut G, whereupon the piston and feed-screw may, when quick movement is required, be slid from one end of the apparatus to the other, or be removed by being slid from the container when it is required to remove the piston and feed-screw from the apparatus for cleaning purposes.

We prefer to make the hand wheel H capable of sliding along the feed-screw but incapable of rotation thereon, the hand wheel being provided with a feather, or a screw, such as $h1$, which slides in a feather-way $f3$ formed in the feed-screw F, as shown in Figs. 1 and 11; rotation of the hand-wheel H being transmitted to the spindle or feed-screw F through the feather or screw $h1$. This arrangement permits the location of the hand-wheel H adjacent to the back-plate B when the feeding operation takes place, an arrangement which is much more convenient than the one in which the hand wheel is keyed to the end $f1$ of the feed screw, and has the important advantage that the hand-wheel, irrespectively of the position of the piston, is always over the base plate A, thus ensuring stability of the apparatus. The arrangement of the sliding hand wheel also has the advantage, when the nut G is in the form of a half-nut, that the hand wheel may be employed to hold the feed screw in engaging relationship with the half-nut.

A convenient mode for accomplishing this is shown in Figs. 1, 7, 8 and 9.

The portion g1 of the half-nut or a similar part integral with or attached to the back-plate extends beyond the face of the back-plate, and the hand wheel H is recessed as at h2 to form a cylindrical bore in the extension h3, which bore engages with the semi-circular periphery of the extension part such as g1. The half nut is constructed as shown in Figs. 5 and 6 with a flange g2 by which it is secured to the boss b5 of the back plate B (see Fig. 1).

In order to guide the operator in regard to the amount of feed given to the slab of meat, the hand wheel H (see Figs. 14 and 15) may have a series of ratchet teeth T formed on its periphery, with which teeth a clicking spring pawl t1 engages, the pawl being anchored on the pins t2 and t3 carried by the back plate; or, in a modification, the teeth T may be formed on the inner face of the hand-wheel H, the arrangement of the clicking pawl being correspondingly modified. When the feed-screw is turned in the direction of the arrow (Fig. 15) to give the feed the pawl clicks as each tooth passes under it; each click representing a tenth of a revolution, the feed imparted corresponding to one tenth of the pitch of the screw. The device may thus be employed to enable slices of any desired uniform thickness to be cut off.

Usually a lid M, hinged at m1 to the base, is fitted which lid when closed covers over the cut end of the meat. The lid when turned down may form a suitable receptacle to take the slices as they are cut, and it may be provided with a pad to arrest, without damage to its cutting edge, the knife which is used for slicing.

The feed-screw F is, at its forward end turned down at as f2 (Fig. 10) the portion f2 being a loose fit in the sleeve m3 which in turn is a driving fit in the bore p1, of the piston P. The spigot f2 is fitted with an end plate f4 and screw f5, which holds the feed-screw against axial movement relatively to the sleeve m3, the latter being held against axial movement in the bore p1 by frictional grip.

Instead of employing the hand wheel H to hold the feed-screw in engagement with the half-nut G, a presser piece J may be employed, as shown in Figs. 12 and 13, the presser plate is fulcrumed about the pin j1, and is pressed in contact with the upper surface of the feed-screw F by its spring j2 bearing against the abutment j3; the pivot pin j1 and abutment j3 being carried by the back-plate B.

In the modification illustrated in Figs. 17 and 18 the base plate A and the back-plate B are cast integral, the rear end of the container C as before is carried in a socketed portion of the back plate. Instead of a cradle-like seating D formed at the end of the base-plate to support the front end of the container, the flange b3 of the back plate is extended curvilinearly as at b10 from the rear to the front and forms a continuous support of the lower portion of the container; its interior surface being cylindrical in the case of a cylindrical container and being rectangular cross-section when the container is of rectangular configuration. The feed-screw F and hand wheel H are constructed as in the modification already described except that a spigot f2 of the feed-screw rotates in the bore in the piston instead of in a sleeve as in the modification described, being held in place by the washer f4 and screw f5. In this modification the presser plate J2 is pivoted on one side at j5 and is provided with a tension spring j6 attached at one end to the presser plate and at the other to the pin j7. The base is provided with feet a10 which in the arrangement shown give a horizontal disposition of the axis of the cylinder. Where it is desired to have the inclined arrangement of the modification first described the front feed would be lengthened.

An elastic pad would be interposed between the container and the cradle portion b12, said pad being made to extend round the flange b3.

The back-plate may be split along the line X, X, the slit extending, say, about two-thirds of the diameter to form an elastic socket to grip the rear end of the container, and in some cases lugs may be formed at the top on opposite sides of the slit through which a bolt may be passed to give the necessary clamping pressure.

The front edge c2 as before forms the guide surface for the slicing knife, and the operation of feeding is performed as in the modification first described.

The details of construction may be varied; for instance, the plunger may be made of glass, the sleeve m3 being cemented and a suitable socket formed in the glass plunger.

Having now fully described our invention we declare that what we claim and desire to obtain by Letters Patent is:—

1. In apparatus for slicing meat, in combination, a container through which the slab of meat to be sliced is fed, the face of the front edge of the container forming the guide surface for the cutting knife; supporting means to which the container is attached; means for propelling the meat through the container comprising a feed screw; and means for rotating the feed screw and a screw-threaded part fixed relatively to the container with which part the feed screw engages, the circumferential extent of the screw-threads of the said part subtending an angle not exceeding 180°, whereby the feed screw may by transverse movement be disengaged from the said nut and be moved freely longitudinally; substantially as described.

2. The combination with the elements of claim 1, of means for holding the feed screw in engagement with the fixed screw-threaded part; substantially as described.

3. Apparatus as claimed in claim 1, in which the feed screw is rotated by a hand wheel slidably carried on the feed screw but prevented from rotation relatively thereto; substantially as described.

4. Apparatus as claimed in claim 1, in which the feed screw is rotated by a hand wheel slidably carried on the feed screw, but prevented from rotation relatively thereto; means comprising two elements adapted to engage when the hand wheel is slid into its forward position one element fixed relatively to the container and the other carried by the hand wheel, said elements when engaged being adapted to maintain the rotating feed screw in engagement with the fixed screw-threaded part; substantially as described.

5. Apparatus as claimed in claim 1, in which the feed screw is rotated by a hand wheel slidably carried on the feed screw but prevented from rotation relatively thereto, said wheel having a cylindrical recess in its face; an engaging part fixed relatively to the container and adapted when the hand wheel is slid into its forward position to engage the said recess, said engagement being adapted to hold the screw in engagement with the fixed screw-threaded part; substantially as described.

6. In apparatus for slicing meat in combination, a container through which the slab of meat to be sliced is fed, the face of the front edge of the container forming the guide surface for the cutting knife; means for supporting the container, comprising a back-plate having a central aperture through which the feed passes, to which back-plate the rear end of the container is connected; and a base-plate carrying the back-plate; means for rotating the feed screw comprising a hand wheel slidable on the feed screw but held against rotation relatively thereto; a screw-threaded part the screw-threads of which subtend an angle less than 180° fixed to the back-plate; the aperture in said back-plate having a transverse dimension sufficient to permit the transverse movement of the feed screw necessary to disengage it from the said screw-threaded part; substantially as described.

7. In apparatus as claimed in claim 6, in which the hand wheel has a cylindrical recess, and in which the back plate has a projection adapted when the hand-wheel is in its forward position to engage the said recess and to hold the feed screw in engagement with the fixed screw-threaded part while it is being rotated by the hand wheel; substantially as described.

8. In apparatus as claimed in claim 6, in which the hand-wheel has a cylindrical recess, and in which the fixed screw-threaded part projects beyond the back-plate and is adapted to engage the said recess, and by engagement therewith to hold the feed screw in engagement with the said screw-threaded part while the screw is being rotated by the hand wheel; substantially as described.

9. The combination with a meat slicing machine as claimed in claim 1; of means for estimating the amount of the feed movement imparted, said means comprising ratchet teeth formed on the hand wheel; and a spring pawl having a fixed pivot and adapted, as the hand-wheel is rotated to give the feed, to ride over the said teeth; substantially as described.

10. In a meat slicing machine in combination; a container through which the slab of meat to be sliced is fed, the face of the front edge of the container forming the guide surface for the cutting knife; means for feeding the meat through the container, comprising a centrally located feed screw; means for supporting the container comprising a back-plate having a cylindrical recess adapted to take and to locate the rear end of the container in concentric relationship with the feed-screw; a base-plate to the rear end of which the back-plate is directly attached, and having at its front end a cradle on which the lower part of the front end of the container rests; means for detachably holding the container in position on the cradle comprising a flexible band encircling the container; and means for tightening the band consisting of a clamping bolt attached to the band, and a nut fitting the clamping bolt and engaging with a part held in fixed relationship with the base plate; substantially as described.

11. In apparatus as claimed in claim 1 the container being of cylindrical cross-section and having one or more internally projecting longitudinal ribs thereon to engage the periphery of the circular slab of meat; substantially as described.

12. In apparatus as claimed in claim 1, the container being in the form of an open-ended prism of transparent material; substantially as described.

In witness whereof we have hereunto set our hands.

ERNEST BASELEY SCOTT.
JOHN HENRY DAVIES.